(12) United States Patent
Aharoni et al.

(10) Patent No.: US 8,140,476 B2
(45) Date of Patent: Mar. 20, 2012

(54) STATISTICAL QUALITY MONITORING AND ENHANCEMENT

(75) Inventors: Ehud Aharoni, Kfar Saba (IL); Hani Neuvirth, Tel-Aviv (IL); Saharon Rosset, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 12/639,005

(22) Filed: Dec. 16, 2009

(65) Prior Publication Data

US 2011/0145291 A1 Jun. 16, 2011

(51) Int. Cl.
*G06F 7/00* (2006.01)
*G06F 17/00* (2006.01)

(52) U.S. Cl. ....................................................... 707/634
(58) Field of Classification Search ........................ None
See application file for complete search history.

(56) References Cited

U.S. PATENT DOCUMENTS

| | | | | |
|---|---|---|---|---|
| 5,701,471 A * | 12/1997 | Subramanyam | ............... | 717/124 |
| 5,852,818 A * | 12/1998 | Guay et al. | ............. | 707/999.001 |
| 5,953,715 A * | 9/1999 | Cincinatus et al. | .... | 707/999.001 |
| 6,138,112 A * | 10/2000 | Slutz | ............................. | 707/748 |
| 6,360,332 B1 * | 3/2002 | Weinberg et al. | .............. | 714/4.1 |
| 6,405,195 B1 | 6/2002 | Ahlberg | | |
| 6,574,522 B1 | 6/2003 | Douglas | | |
| 6,581,052 B1 * | 6/2003 | Slutz | ...................... | 707/999.002 |
| 6,810,494 B2 * | 10/2004 | Weinberg et al. | ............... | 714/46 |
| 6,931,629 B1 * | 8/2005 | Yount et al. | .................... | 717/126 |
| 7,007,007 B2 * | 2/2006 | Slutz | ............................ | 707/809 |

* cited by examiner

*Primary Examiner* — Tim T Vo
*Assistant Examiner* — Garrett Smith
(74) *Attorney, Agent, or Firm* — Ziv Glazberg

(57) ABSTRACT

A method and computer system for monitoring and controlling the quality of tests performed upon a database. A statistical quality layer is provided, which for each new test to be executed on the database, provides recommendations as to a confidence level to be applied to the test and to a number of additional data records to be added to the database in order to maintain the total expected number of type-I errors of tests performed upon the database. The method and computer system further provide access control of users to the database.

22 Claims, 3 Drawing Sheets

STATISTICAL QUALITY MONITORING AND ENHANCEMENT

BACKGROUND

The present disclosure relates to databases in general, and to monitoring and enhancing statistical measures in databases, in particular.

In statistics, the term type-I errors refers to false positive results, i.e., cases in which a conclusion deduced upon a finite dataset of samples is incorrect for the general population, or in other words situations in which the null hypothesis is wrongly rejected.

As the number of statistical tests executed on the same dataset increases, the probability that one or more of the drawn conclusions is wrong, increases as well. This phenomenon is sometimes referred to as the multiple hypotheses problem.

In many research fields, including for example biology, epidemiology, social studies or others, one or more communities of researchers conduct multiple researches on a common database. In such environments, neglecting the multiple hypothesis problem may amplify the occurrence of community-wise false positives.

Yet another problem relates to the monitoring and control of database owners or managers over the usage and tests performed upon the available data. Data owners and managers are not always aware of the type and scope of tests performed upon the data, and can thus be misled about the real usage of the data, or under-compensated.

BRIEF SUMMARY OF THE DISCLOSURE

One exemplary embodiment of the disclosed subject matter is a computerized system comprising a database management component, the database management component comprising: a statistical quality layer for controlling quality parameters of a test performed upon a database, the statistical quality layer comprising a compensation determination component for determining a number of data records to be added to the database so as to limit an expected number of errors associated with the database once the test is performed.

Another exemplary embodiment of the disclosed subject matter is a method for controlling a database stored on a storage device, comprising: receiving a request for a test to be executed upon the database; determining a significance level for the test; determining a number of additional data records to be added to the database so that the test is in compliance with the significance level; and receiving additional data records as indicated by the number of additional data records and storing the additional data records in the database, whereby the database is transformed to further include the additional data records.

Yet another exemplary embodiment of the disclosed subject matter is a computer program product comprising: a computer readable media; first program instruction for receiving a request for a test to be executed upon the database; second program instruction for determining a significance level for the test; third program instruction for determining a number of data records to be added to the database so that the test is in compliance with the significance level; and fourth program instruction for receiving data records as indicated by the number of data records and storing the data records in the database, whereby the database is transformed to further include the data records.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
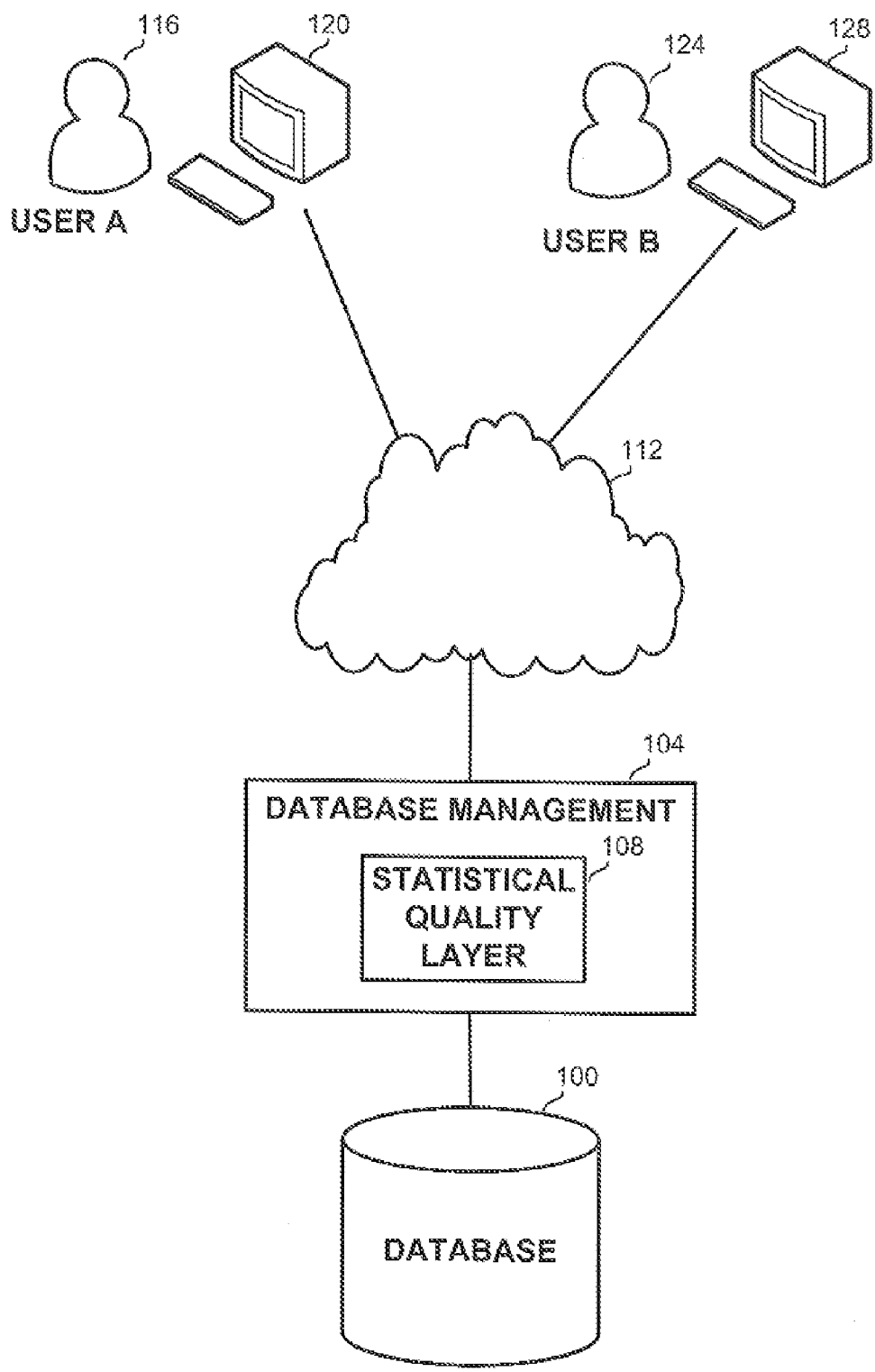
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The term level used in the disclosure relates to the significance level of a statistical test, and denotes the probability of a type-I error for the test, or the probability that the null hypothesis will be wrongly rejected. The level is usually set by the researcher in relation to the consequences of such an error. Therefore it is desired to set the confidence level as small as possible in order to prevent, as much as possible, the researcher from inadvertently making false claims.

One technical problem dealt with by the disclosed subject matter is the multiple hypotheses problem, in which when multiple statistical tests are executed over a certain dataset, the probability of a false positive, being the deduction of wrong conclusions, increases.

Another technical problem dealt with by the disclosed subject matter relates to monitoring and control of database owners over the database and tests performed upon the database. A database owner or manager may not be fully aware of the full usage of the data. Such usage may therefore contradict with the owner's or manager's views. Further, the owners or managers being unaware of the full scope of performed tests, may be under-compensated for the usage of their data.

One technical solution is to provide a statistical quality (SQ) layer for monitoring and controlling the database. A monitor and control layer may be used such that it buffers the database from its potential users, and all usages of the database may be governed by this layer.

The SQ layer provides monitoring capabilities to the owner or manager of the dataset, including but not limited to: keeping track of the database, its data and integrity; keeping track of tests and experiments performed upon the data (e.g., t-test); the null hypothesis, the alternative hypothesis or other hypotheses used by a test; assumptions made by the test (e.g., normal distribution of the data); the power, level and effect-size of the test; the statistic rejection region; the test result, or the like.

The data may also include database-wise statistical quality measures, such as the number of type-I errors that can be expected from the currently executed experiments, or the like.

Monitoring can be implemented in a multiplicity of ways. In one embodiment, users may be allowed free and unlimited access to the database, provided that a user fills out a form indicating the tests he or she intends to perform. This approach may be applicable to small communities in which the database owner or manager may know the users, or the users may be trusted to comply. In another embodiment, a user has to be granted a permission or privilege to access the database. Permissions can be limited to a certain time frame or to certain data, possibly based on forms the users have to fill. The users still have to be trusted not to keep local copies of the data when they have access rights. In yet another embodiment, users may be denied from accessing the database. Instead, a user may fill out a form indicating the required test details. The test may then be performed by the database owner or manager and the results may be reported back to the user.

The control operations performed by the SQ layer may include providing the owner or manager with reports related to the database and experiments, as well as suggestions related to maintaining the database and to the tests. The SQ layer, based on the monitoring data it may have collected or otherwise received, may enable the database manager to control the quality of the research conducted upon the database.

In some exemplary embodiments, the SQ layer may comprise a user interface for allowing the database manager or owner to view current or expected statistical quality measures, receive suggestions and perform operations, and optionally for allowing users to access the database or fill forms.

The SQ layer may also comprise components for generating suggestions for the owner or manager, such as but not limited to any one or more of the following: suggesting changes to the database size (e.g., suggest adding a number of new database samples); setting the level of a test; limiting the execution of statistical tests with particular characteristics (e.g., prohibit a test having a level above a certain threshold); prohibit the execution of a certain statistical test until a certain action is taken (e.g., prohibit a particular test until a certain amount of new database samples is added to the database), or other suggestions or recommendations. Alternatively, the SQ layer may provide the owner or manager with tools for determining relevant measures for a particular experiment.

Adding data to the database increases the reliability of tests performed upon the data, and thus tests performed upon the enlarged database can have higher significance level then the same tests when performed before the enrichment of the database.

If it is advised to add more records to the database, the new data can be either obtained from one or more users as a condition to using the database, or by the database owner or manager upon receipt of financial funds or other compensation from the user.

One technical effect of utilizing the disclosed subject matter is the enablement of monitoring and control of a database by its owner or manager. Utilizing the disclosed subject matter may enable the owner or manager to receive more information and better control the database, the tests performed upon the data and their characteristics, including reliability.

Another technical effect of the SQ layer is the database owners or managers may receive appropriate compensation for the usage of the data, whether the compensation takes the form of additional data, financial compensation, or others.

Referring now to FIG. 1 showing a computerized environment in which the disclosed subject matter is used, in accordance with some exemplary embodiments of the subject matter. The computerized environment comprises a storage device 100, which stores the data upon which tests or experiments are to be carries out. The data may include raw data as well as processed data. Storage device 100 may also store data related to tests, such as test descriptions, test results and others. Storage device 100 may be a mass storage device, for example an optical storage device such as a CD, a DVD, or a laser disk; a magnetic storage device such as a tape or a hard disk; a semiconductor storage device such as Flash device, memory stick, or the like.

The data in storage device 100 is optionally organized as a database, and managed by database management component 104. Database management component 104 may be implemented as a set of computer instructions arranged as one or more executables, modules, units, functions or other components executed by one or more computing platforms. Database management component 104 comprises the functionality required for managing a database, such as components for database communication, query execution, optimization, user privileges, security, backup, or the like. Database management component 104 may be any commercial or proprietary product.

In addition, database management component 104 may further comprise statistical quality layer 108, which is responsible for controlling quality parameters of one or more tests performed upon a database, by providing monitoring and control capabilities to the owner or manager of the database. Statistical quality layer 108 may communicate with or otherwise use other components or functionalities of database management component 104. Statistical quality layer 108 is further detailed in association with FIG. 2 below.

Database management component 104 communicates with users or with other entities such as backup services (not shown) or with any other unit, using any wired or wireless communication channel 112, such as the Internet, Intranet, RF, Local Area Network (LAN), Wide Area Network (WAN), telephone network, voice over IP and the like, employing commonly used protocols such as TCP, IP, IPTV, derivatives thereof or other communication protocols.

Users such as user A (116) using computing platform 120, or user B (124) using computing platform 128 may access database management component 104 through communication channel 112, in order to receive services from the database, such as determining cooperation options, receiving information about tests to be executed, providing test parameters, executing tests, receiving test results, or others.

Figure 2:
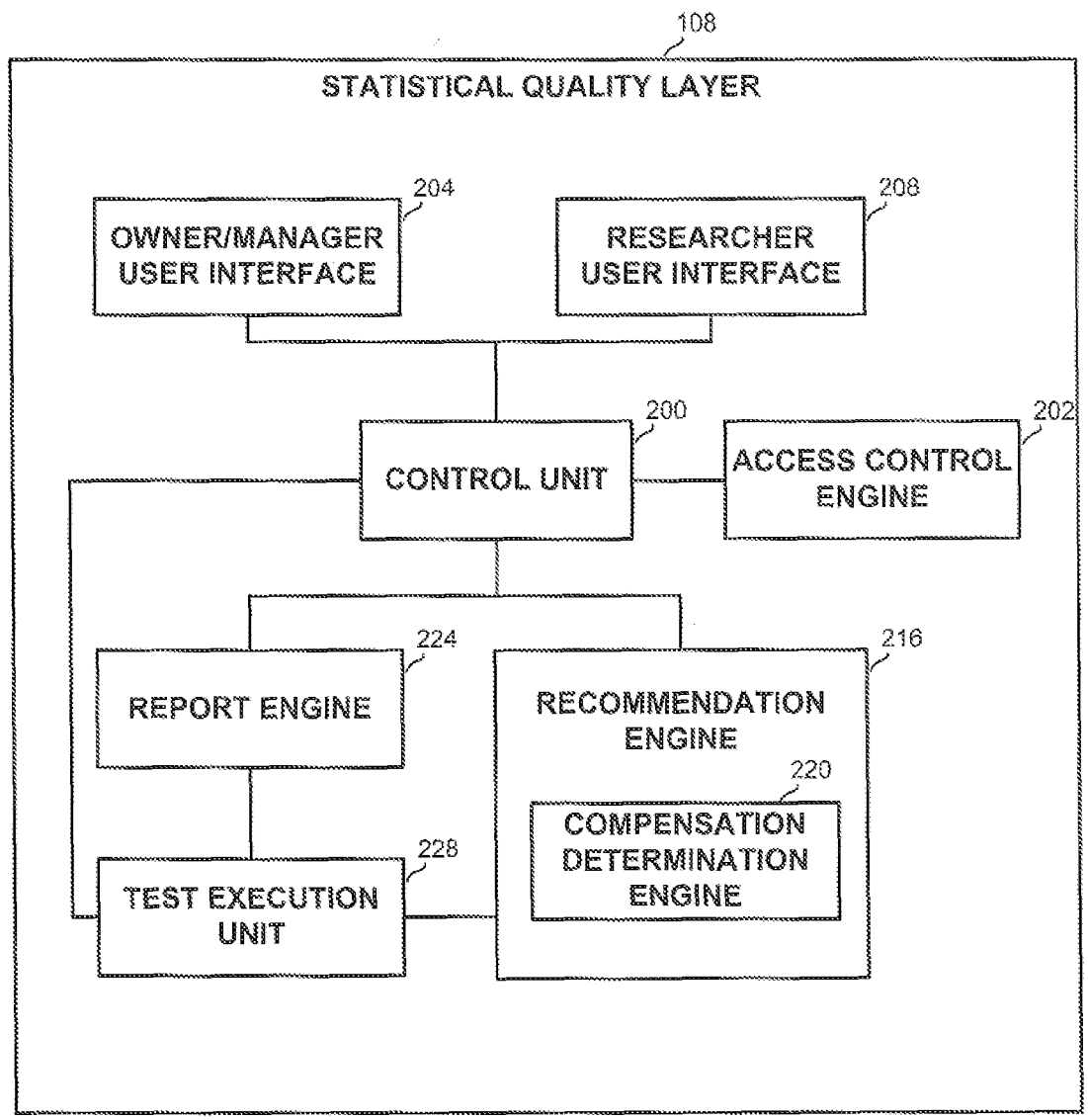
FIG. 2 shows a block diagram of a statistical layer in accordance with some exemplary embodiments of the disclosed subject matter.

Referring now to FIG. 2, showing a schematic block diagram of statistical quality layer 108. Statistical quality layer 108 is optionally implemented as one or more sets of interrelated computer instructions, which may communicate with other components of layer 108 or with other components of database management component 104 of FIG. 1. Statistical quality layer 108 may comprise a control component 200 responsible for managing the control and information flow within the statistical quality layer 108, and for communicating, coordinating and scheduling the activity of other components and for communicating with external components such as user interfaces.

Statistical quality layer 108 may comprise access control engine 202 for controlling the access of users to the database in accordance with the disclosure. Thus, access control engine 202 may allow free and unlimited access of users to the database, provided that each user fills out a form indicating the tests he or she intends to perform. In another embodiment, a user has to be granted a permission or privilege to access the database. Permissions may be limited to a certain time frame or to certain data, possibly based on forms the users may fill. In yet another embodiment, users are denied from accessing the database. Instead, a user fills out a form indicating the required test details. The test is then performed by the database owner or manager and the results are reported back to the user. The access control engine 202 may provide different access permission to different users, such as for example full access permissions to the database owner, partial access permissions to a user that filled a form and no access permissions to a user that did not submit any form.

Statistical quality layer 108 may further comprise an owner or manager user interface component 204 for receiving commands or data and providing information to the owner or manager of the database, and a researcher user interface component 208 for receiving questions, queries, or data from users of the database, and for providing the users with answers, results, or any other data related to the database or to the test.

Further components of statistical quality layer 108 may comprise report engine 224 responsible for generating reports to an owner, manager, or user of the database. The report can relate to the data, or to past, present or future tests, required data related to a test, required compensation to be received from a user, or any other aspect of the database or tests. Layer 108 may further comprise a recommendation engine 216. The recommendation engine 216 may be responsible for determining recommendations to be made to the database owner or manager, regarding maintenance of the database, required details, additional required data for one or more tests or experiments, or the like.

The recommendation engine 216 may comprise a compensation determination engine 220 for determining compensation to be required from a user of the database as a condition for performing one or more tests. In alternative embodiment, the compensation determination engine 220 can be implemented as a separate component rather than as part of recommendation engine 216.

Yet another component of layer 108 may be a test execution unit 228, responsible for re-executing past tests if different or more data is available.

It will be appreciated that the structure of FIG. 2 is exemplary only, and that other structures can be designed which provide the required functionality. It will be appreciated that any element of FIG. 2 can be implemented as two or more component such as executables, modules, functions, libraries or the like. Alternatively, two or more components of FIG. 2 can be implemented as one or more components, or share functionality from some components.

Figure 3:
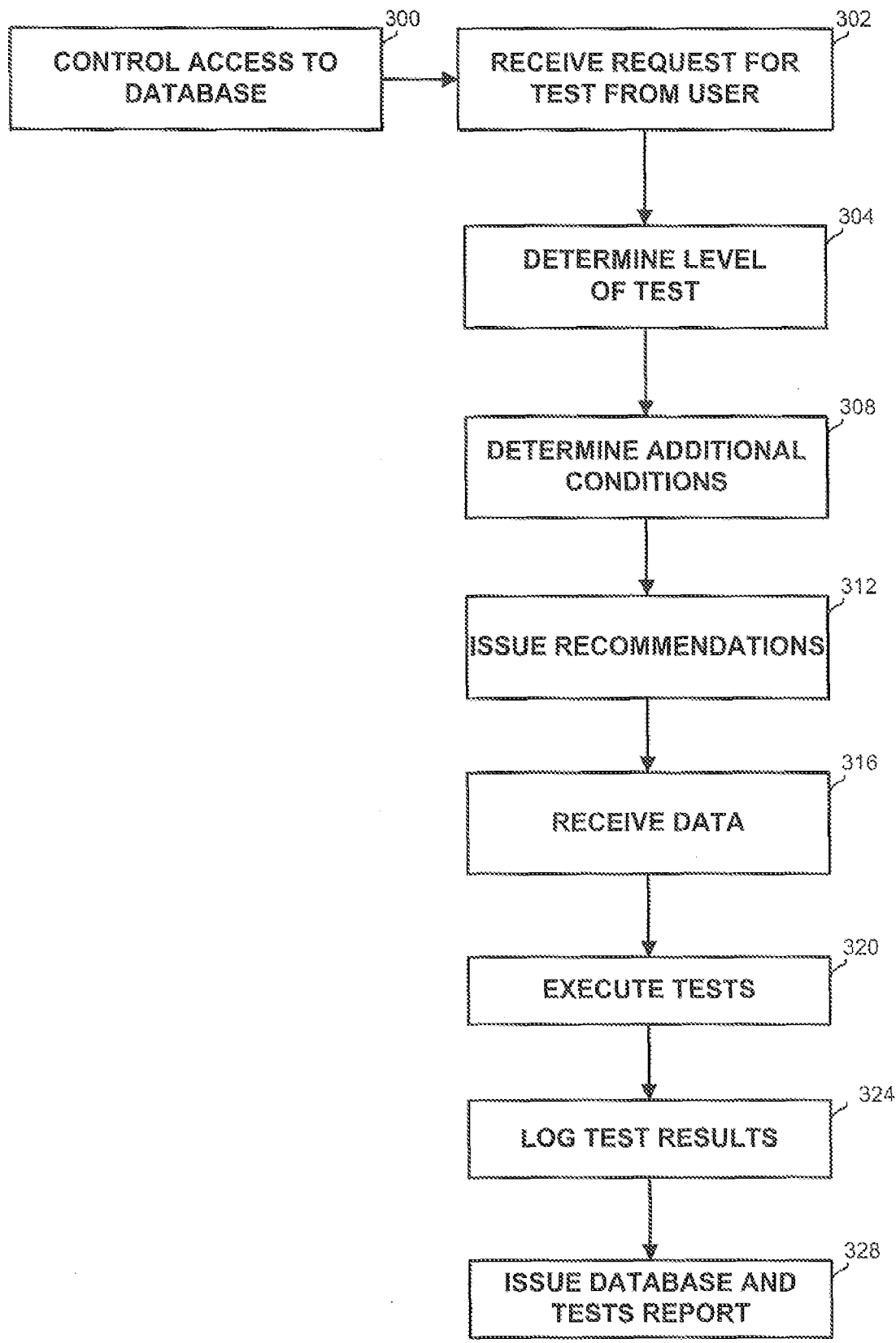
FIG. 3 shows a flowchart diagram of a method for enhancing statistical quality, in accordance with some exemplary embodiments of the disclosed subject matter.

Referring now to FIG. 3, showing a flowchart of the main steps in a method for monitoring and controlling a database.

It will be appreciated by a person skilled in the art that the disclosed method adds steps beyond the functionality required for managing a database, including for example identification, security, permission handling, communication, test execution, backup, reports and others. However, it will be appreciated that some of the steps can use functionality existing in current systems.

In step 300, the access of users to the database system may be controlled in accordance with the specific implementation, for example the user can be granted free access to the database and just has to fill forms, the access can be limited, or the access can be denies and the database owner or manager would perform the test for the user.

In step 302, a request may be received from a user of the database. The request may relate to a test to be executed, to results of a test, or the like. The user may provide parameters required for the test, such as but not limited to any one or more of the following: test description, assumptions on the data, the null and alternative hypotheses, power, effect size, and the like.

In step 304, the level (confidence level) of the test requested by the user may be determined.

In step 308, additional conditions for the test user may be determined, including for example the required number of data records to be added to the database for the relevant test. The records may be required for enlarging the database or for replacing outdated records which may be discarded. The level and amount of data may be determined based on the current database and the test details supplied by the user. In some exemplary embodiments, the level may be allocated by the database owner or manager, in order to provide two objectives. First, the expected total number of type-I errors related to tests conducted upon the database should not exceed a predetermined number. The second objective relates to maintaining stability, so that future repetitions of tests will not be more expensive, i.e., will not require the user to supply larger amount of additional data. Optionally, a general fairness requirement may be imposed, so that executing a more demanding test will require a larger amount of additional data. It will be appreciated that step 304 and step 308 can be implemented as a single step of as separate steps. Some embodiments for determining the level of the amount of additional data are detailed below.

According to the database owner's or manager's policy, the user can either supply the actual required data, or compensate the database owner or manager for obtaining the data.

Additional recommendations can be made to the database owner or manager, related for example to allowing or forbidding a certain test or test type, or stipulating a test or a test type.

In step 312, the recommendations for the level, amount of data required or other recommendations may be issued to the database owner or manager, and optionally to the user.

In step 316, the new data may be received, either from the user or from another party, and stored in the database. The database is transformed to include the received data records.

In step 320, the test required by the user may be performed. Optionally, and depending on the compensation method employed, past tests may be repeated on the enlarged database with decreased level so as to ensure a bound over the expected number of type-I errors.

In step 324, the test results may be logged or otherwise stored within the database, in order to enable future access to the results or other parameters.

In step 328, a database or test report may be issued to the database owner, manager, or user. It will be appreciated that logging the tests can be done before or after issuing the reports.

Determining the level allocated for each test, i.e., the maximal allowed probability that the null hypothesis is wrongly rejected, and its cost, i.e., the amount of new database records that should be supplied as compensation, can be done in a multiplicity of ways. One exemplary method is referred to as "persistent". Another exemplary method is referred to as "volatile".

In the persistent method, as well as in the volatile method, the significance level allowed for the next test and the cost are determined in accordance with the test parameters as supplied by the user, mainly the statistic, assumptions on data, power, effect size and the like. The parameters that are unspecified by the user include the required level and the required number of samples required for this test, which therefore become a function of one another. If the number of currently available and useable records in the database is smaller than the number of records required for the test, the user will have to provide or compensate for the difference between the number of currently available and useable records, and the number of required records.

$L(n)$ denotes the "level-sample" function, i.e., the function that defines the significance level of the particular test for any given number of samples. For example, in some well known and widely used statistical tests, such as t-test, the "level sample" function can be computed directly based on known probability distributions, e.g., t-distribution and non-central t-distribution. In other cases, the "level-sample" function can be estimated using simulations, e.g., by randomly producing data of similar statistical nature, executing the test on this data, and estimating the number of type-I errors using repeated tests with the given power and effect-size.

Randomly producing data has a number of advantages: first, since the data is generated rather than gathered, the true hypothesis is known in advance, so that it can be determined whether the test is right or wrong while for real data it is unknown which hypothesis is true and which is false. Second, random data can be produced multiple times with different seeds. The repetitions allows the estimation of the type-I and type-II error frequency.

In the persistent method, the level for each test is allocated using an exponentially decaying series (i.e., each test receives a level which is a constant fraction of the level allocated for the previous test). Thus, the sum of all levels allocated to all tests converges to a predetermined constant.

The number of new records that should be supplied or paid for by the user is determined so as to compensate for this exponential decrease, and the user is allowed to perform a test in exchange for the new samples and receives the test results immediately.

For example, denote by a the upper limit of the type-I errors expected count, and denote by n be the current number of database samples. a may be predetermined by the database owner or manager.

At any given time, the database manager or owner may keep a bank of $aq^n$ potential type-I errors wherein $0<q<1$ and is also a predetermined number.

The level for each new test may be allocated by "withdrawing" from this bank. At the initial state, the database is empty i.e., n=0, therefore the sum of all levels of all tests is bound by a. The level allowed for the next test, and $\delta$ (the number of records to be added to the database) are determined using the formula: $L(n+\delta) < aq^n - aq^{n+\delta}$, wherein L denotes the "level-sample" function for the given statistical test as described above.

Using the persistent method may require minimal monitoring, since each test may be executed once. In this case, only the test parameters may be recorded, and it is not necessary to store or re-execute the test.

The persistent method thus provides for a bound expected number of type-I errors and is stable, so that each new test having characteristics equal to those of a past test, will not have to supply more new records than the past test.

Using the volatile method, the user is allowed to submit a test to the database in exchange for $\delta$ new samples. All tests previously submitted to the database are re-executed every time the number of samples in the database changes. The test results are thus volatile, i.e., a test may pass at a certain point in time and fail at a later point in time, or vice versa. However, the volatile scheme allows for less restrictive level allocation. Every time the tests are executed, each test is allocated the lowest possible level allowed in accordance with the current number of samples. The $\delta$ is determined so as to guarantee that the sum of all test levels remains bound by a predetermined value. Although this method requires the storage of all test details and parameters so that the tests can be repeated, it yields overall lower $\delta$ (i.e., a lower "price" in number of data records to be added in respect to a predetermined test). Another advantage of this method is that it supports discarding old database records from time to time, for example if they become outdated. In such case, the cost $\delta$ is determined so as to compensate for the discarded records as well as for controlling the expected number of type-I errors. These costs will guarantee that in spite of the discarded records, the remaining number of records in the database will gradually grow so as to guarantee control of type-I errors. It will thus be appreciated by a person skilled in the art that a test is re-executed upon the records that are present at the database at the time of execution. Thus, a test may be executed upon records that have been included in previous executions of the test, as well as upon new records, but not upon records discarded earlier to the execution.

In the volatile method, a, n, and $\delta$ are as in the persistent version. Each test executed upon the database, is not executed just once, but is rather repeated every time the database size increases. At each re-execution, each test is allocated the lowest possible level allowed by computing the "level-sample" function that is associated with this test, given the current number of database samples, and the database manager publishes the updated test results for all hypotheses of all tests.

$\delta$, i.e., the number of new samples that should be supplied is determined every time a new test is first submitted to the database. It is determined by solving the following equation for $\delta$: $L_1(n+\delta) + L_2(n+\delta) + \ldots + L_t(n+\delta) < a$, wherein $L_1, L_2, \ldots, L_{t-1}$ are the "level-sample" or confidence level functions of all previously submitted tests, as described in association with the persistent version above. $L_t$ is the "level-sample" function of the current test.

It will be appreciated that the disclosed method and apparatus and their various embodiments can be utilized by a variety of user types. The user types may include but are not limited to: statistical researchers, database owners or managers, sample providers and domain researchers.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized system having a processor, said computerized system comprising a database management component, the database management component comprising:
    a statistical quality layer for controlling quality parameters of a test performed upon a database, the statistical quality layer comprising a compensation determination component for determining a number of data records to be added to the database so as to limit an expected number of errors associated with the database once the test is performed; and
    wherein the number of data records is determined such that $L(n+\delta) < aq^n - aq^{n+\delta}$, wherein L is a significance level associated with the test when executed upon $n+\delta$ samples, n is a number of records in the database, $\delta$ is the number of additional data records, q is a number between 0 and 1, and a is the predetermined quantity.

2. The computerized system of claim 1 further comprising a recommendation engine for issuing a recommendation related to the number of data records to be added to the database determined by said compensation determination component.

3. The computerized system of claim 1 further comprising a recommendation engine for issuing a recommendation related to a significance level of the test.

4. The computerized system of claim 1 further comprising a test execution component for executing the test.

5. The computerized system of claim 1 further comprising a report engine for generating a report related to the database or to the test performed upon the database.

6. The computerized system of claim 1 further comprising a manager user interface for receiving a command from a manager of the database.

7. The computerized system of claim 1 further comprising a researcher user interface for receiving a command from a user associated with a test to be performed upon the database.

8. The computerized system of claim 1 further comprising a control component for managing control and information flow within the statistical quality layer.

9. The computerized system of claim 1 further comprising an access control engine for controlling access of a user of the computerized system to the database.

10. The computerized system of claim 1, wherein the errors are type-I errors.

11. The computerized system of claim 1, wherein the recommendation relates to allowing the test, forbidding the test, or stipulating the test upon a condition.

12. method for controlling a database stored on a storage device comprising:
    receiving a request for a test to be executed upon the database;
    determining a significance level for the test;
    determining a number of data records to be added to the database so that the test is in compliance with the significance level, wherein the number of data records is determined such that $L(n+\delta) < aq^n - aq^{n+\delta}$, wherein L is a significance level associated with the test when executed upon n+δ samples, n is a number of records in the database, δ is the number of additional data records. q is a number between 0 and 1, and a is the predetermined quantity;
    receiving data records as indicated by the number of data records and storing the data records in the database; and
    whereby the database is transformed to further include the data records.

13. The method of claim 12 further comprising executing the test upon the database.

14. The method of claim 12, wherein the number of additional data records is determined in accordance with an expected total number of type-I errors related to the database, and with the size of the database.

15. The method of claim 12 further comprising issuing a recommendation related to allowing the test, forbidding the test, or stipulating the test upon a condition.

16. The method of claim 12 further comprising controlling access of a user to the database.

17. The method of claim 12 wherein a manager of the database determines the significance level for the test and the number of additional data records to be added to the database, based upon at least one parameter supplied by a user of the test.

18. The method of claim 17 wherein the at least one parameter is selected from the group consisting of: power; effect size; statistics of the test, and assumptions on data relevant for the test.

19. A computer program product comprising:
    a computer readable media comprising program instructions, wherein execution of the program instructions by a processor causes the processor to carry out the steps of:
    receiving a request for a test to be executed upon the database;
    determining a significance level for the test;
    determining a number of data records to be added to the database so that the test is in compliance with the significance level, wherein the number of data records is determined such that $L(n+\delta) < aq^n - aq^{n+\delta}$, wherein L is a significance level associated with the test when executed upon n+δ samples, n is a number of records in the database, δ is the number of additional data records, q is a number between 0 and 1, and a is the predetermined quantity.;
    receiving data records as indicated by the number of data records and storing the data records in the database; and
    whereby the database is transformed to further include the data records.

20. A method for controlling a database stored on a storage device comprising:
    receiving a request for a test to be executed upon the database;
    determining a significance level for the test;
    determining a number of data records to be added to the database so that the test is in compliance with the significance level, wherein the number of additional data records is determined such that $L_1(n+\delta) + L_2(n+\delta) + \ldots + L_t(n+\delta) < a$, wherein: $L_1, L_2, \ldots, L_{t-1}$ are confidence level functions for previously submitted tests; $L_t$ is confidence level functions for the test; n is a number of records in the database; δ is the number of additional data records; and a is the predetermined quantity;
    receiving data records as indicated by the number of data records and storing the data records in the database; and
    whereby the database is transformed to further include the data records.

21. The method of claim 20 further comprising re-executing tests upon the database, in response to said receiving additional data records.

22. The method of claim 20, wherein the number of additional data records is determined such that current levels of all tests which have been previously executed, sums up to a number smaller than a predetermined quantity.

* * * * *